United States Patent [19]

Van Heuven

[11] 3,875,540

[45] Apr. 1, 1975

[54] MICROSTRIP CONDUCTOR WITH VARIABLE CAPACITOR

[75] Inventor: Johannes Hendrik Cornelis Van Heuven, Emmasingel, Eindhoven, Netherlands

[73] Assignee: U.S. Phillips Corporation, New York, N.Y.

[22] Filed: May 9, 1974

[21] Appl. No.: 468,247

[30] Foreign Application Priority Data

May 25, 1973 Netherlands ........................ 7307295

[52] U.S. Cl. .......... 333/84 M, 317/249 D, 317/256, 333/73 S

[51] Int. Cl. ........................... H01p 3/00, H01g 5/06

[58] Field of Search .............. 333/84 M, 73 S, 84 R; 317/249 D, 256

[56] References Cited

UNITED STATES PATENTS

| | | | |
|---|---|---|---|
| 3,613,035 | 10/1971 | Askew | 333/73 S X |
| 3,639,857 | 2/1972 | Okoshi | 333/84 M X |
| 3,693,118 | 10/1972 | Presser | 333/84 M X |

*Primary Examiner*—E. A. Goldberg
*Attorney, Agent, or Firm*—Frank R. Trifari; Gerald H. Kiel

[57] ABSTRACT

Variable capacitance-capacitor for use in microstrip circuits which is constituted by the capacitance between a conductive member and an insulating part of the ground plate, the insulated part of the ground plate being connected to a strip-like conductor provided on the opposite surface of the substrate by a metallized-through hole, whilst the conductive member is connected to the ground plate via a short circuit for high-frequency energy.

6 Claims, 2 Drawing Figures

Fig.1

MICROSTRIP CONDUCTOR WITH VARIABLE CAPACITOR

Figure 1:
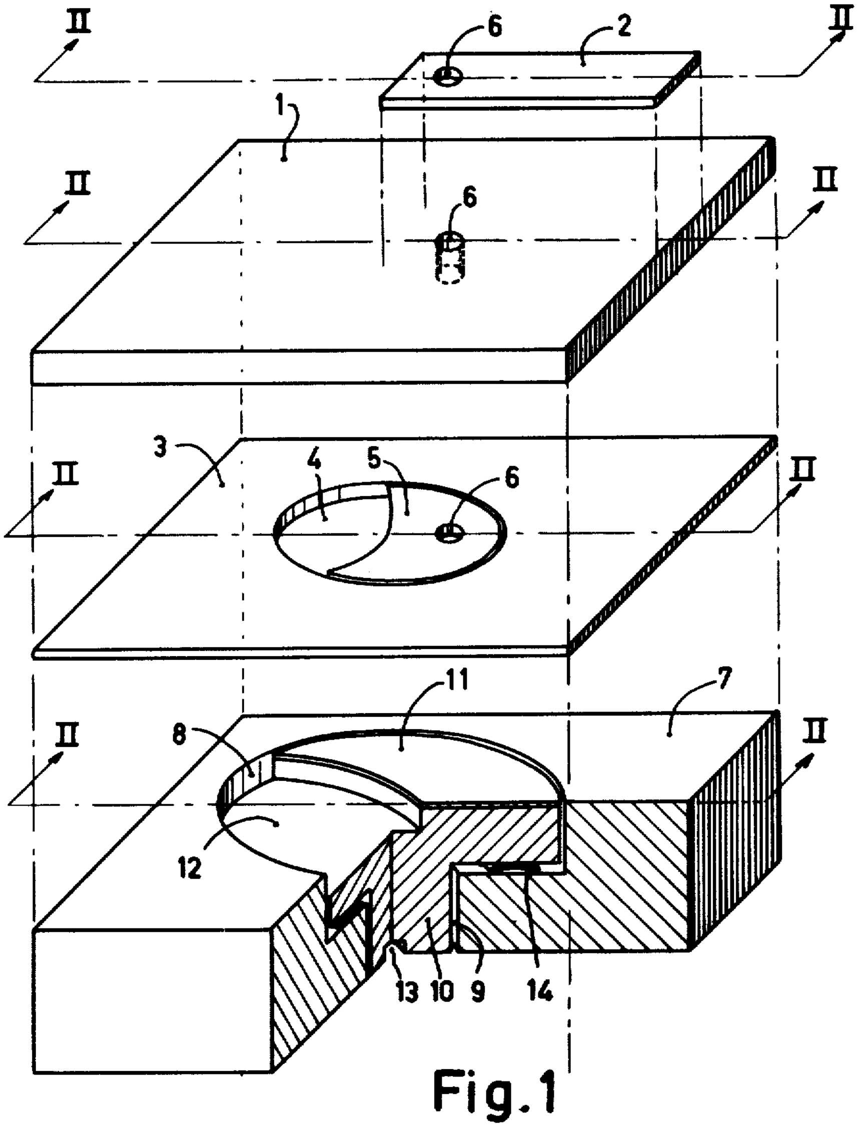

The invention relates to a variable-capacitance capacitor for use in a circuit of microstrip configuration which comprises a substrate of dielectric material, a plane ground plate of conductive material arranged in contact with one of the broad surfaces of the substrate and a narrow strip-like conductor arranged in contact with the other broad surface of the substrate.

Circuits of microstrip configuration are widely used in microwave technology. A problem which arises in this microstrip technology is that mechanically tunable elements cannot readily be realized owing to the fact that they are bulky and interfere with the waves propagating along the upper surface of the narrow strip-like conductor in a degree such that undesirable surface waves are excited.

U.S. Pat. No. 3,693,118 describes an adjustable tuning element for use in circuits of microstrip configuration, which elements avoids the said advantage in that it comprises a channel-shaped opening formed in a ground plate opposite a narrow strip-like conductor and a conductive sliding member adjustably mounted in the plate and capable of occluding the opening to a greater or lesser extent.

The main disadvantages of this tuning element are that it is not a tunable capacitor, because variation of its capacitance also changes the inductance, and that making its capacitive part requires a comparatively large substrate surface area per unit capacitance. Further disadvantages are the difficulty of construction due to the rectangular shape of the channel, the limited region in which the element can be located because of the disposition of the mechanism for adjusting the translatable sliding member at an end surface of the substrate, and the non-defined points of contact between the sliding member and the ground plate, which may result in that linear displacement of the sliding member gives rise to sudden tuning variations.

It is an object of the present invention to provide a variable-capacitance capacitor for use in a circuit of microstrip configuration, which capacitor requires only little surface area of the substrate per unit capacitance and can be manufactured in a comparatively simple manner.

A capacitor according to the invention is characterized in that the ground plate is made up of at least two parts disposed so as to be insulated from one another, a conductive connection being established between the narrow strip-like conductor and a first part of the ground plate, while a conductive member is spaced by a small distance from this first part of the ground plate so as to be insulated therefrom, the disposition of this member relative to the said first part of the ground plate being adjustable, while the conductive member is coupled to a second part of the ground plate for high-frequency energy.

Figure 2:
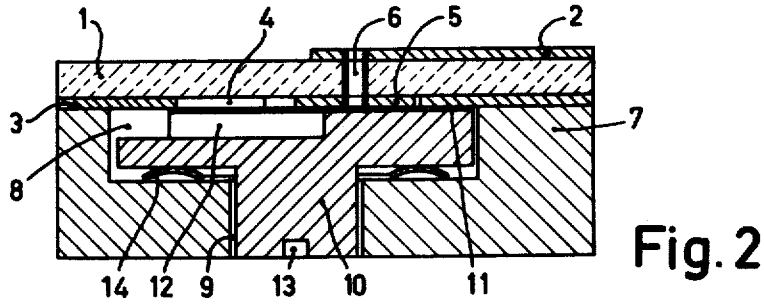

The invention and its advantages will now be set out more fully with reference to an embodiment shown by way of example in the accompanying diagrammatic drawings, like parts being correspondingly designated in the Figures in which:

FIG. 1 is a perspective view of a variable-capacitance capacitor of microstrip configuration according to the invention, in which for clarity the various layers from which the capacitor is made up are shown spaced, and FIG. 2 is a cross-sectional view of the composite capacitor taken on lines II—II of FIG. 1.

FIGS. 1 and 2 show a substrate 1 which is made of a dielectric material and is provided with a high-conductivity narrow-strip-like conductor 2 on its upper surface and with a high-conductivity ground plate 3 at its lower surface. The resulting configuration may form part of, for example, an oscillator or a frequency multiplying circuit or the like, not shown, which is arranged on the same substrate 1.

Changing the tuning or matching of such circuits requires the use of a tuning element such as a variable capacitor. However, the provision of such a capacitor in microstrip configuration is not simple, for when a variable capacitance capacitor is arranged, like the remaining elements of the circuit, on the upper surface of the substrate it greatly disturbs the field configuration which propagates along the strip-like conductor 2. To avoid this disturbance, according to the invention the capacitor is arranged on the lower surface of the substrate. For this purpose the ground plate is made up of two parts 3 and 5 which are disposed so as to be insulated from one another, a conductive connection 6 being established between the strip-like conductor 2 and the part 5 of the ground plate. Furthermore a member 10 is provided so as to be slightly spaced, and insulated, from the part 5, the disposition of this member relative to the part 5 being adjustable, while the conductive member 10 is coupled for high-frequency energy to the other part 3 of the ground plate, the variable capacitor being constituted by the capacitance between the part 5 and the member 10.

As will be seen from the Figures, the part 3 of the ground plate is formed with a circular opening 4 in which a falcate part 5 is situated which fills about half of the opening. The part 5 may be vapour-deposited simultaneously with the part 3 or may be formed simultaneously with the part 3 by etching from a continuous ground plate provided on the substrate 1 at a prior stage.

The strip-like conductor 2, the substrate 1 and the part 5 of the ground plate are formed with aligned bores 6 situated on the longitudinal axis of the strip-like conductor. The walls of the bores are coated with a thin conductive layer in known manner so as to form what is generally referred to as a metallized-through hole 6 which constitutes the conductive connection between the strip-like conductor 2 and the part 5 of the ground plate.

The conductive member 10 lies in a layer 7 which engages a ground plate. The layer 7 may be made of any suitable material. Preferably, however, the casing of the microwave circuit is used. The layer 7 is formed with a first circular-cylindrical hole 8 of large diameter which extends through part of the height of the layer and with a concentric second circular-cylindrical hole 9 of smaller diameter which extends through the remainder of the height of the layer.

The conductive member 10 also is circular-cylindrical and comprises a portion of height and diameter slightly smaller than those of the hole 8 and a portion of diameter slightly smaller than that of the hole 9. From the upper end of the large-diameter circular-cylindrical portion material has been removed to a depth of about one half of the height and over about one half of the surface area in a manner such that the remainder is falcate. The falcate remainder is coated with a thin film 11 of dielectric material. When the member 10 consists of aluminium the film 11 may be the oxide film of the aluminum, which is highly resistant to wear and may be very thin, for example 10 $\mu$um, and has a dielectric constant of 9.

In the assembled condition a resilient ring 14 is interposed between the member 10 and the layer 7 to ensure that the film 11 is urged into flat contact with the parts 5 and/or 3 of the ground plate.

The conductive connection between the strip-like conductor 2, the part 5 of the ground plate and the thin insulating film 11 of high dielectric constant ensures that per unit of substrate area a high capacitance between the conductive member 10 and the conductor 2 is obtainable which does not disturb the wave structure propagating along the conductor 2.

When the layer 7 and the resilient ring 14 are made of a conductive material the diameter of the hole 8 may be equal to that of the opening 4, even if the layer 7 should be coated with an insulating oxide film, because this forms a short circuit for the high-frequency energy.

If however the layer 7 is made of a non-conductive material, in the case of concentricity of the opening 4 and the hole 8 the diameter of the hole 8, and hence the larger diameter of the member 10, must exceed the diameter of the opening 4 in order to produce a large capacitance between the member 10 and the part 3 of the ground plate, which configuration is shown in the Figures.

It should, however, be noted that the hole 8 and the opening 4 need not be concentric and that the shapes of the part 5 and the member 10 may be different from those shown, although the latter have the advantage that the machining operations are restricted to drilling and turning, resulting in a variable-capacitance capacitor which can simply be manufactured.

The end of the smaller-diameter cylindrical portion of the member 10 is provided with a slot 13, enabling the capacitance of the capacitor to be varied by means of a screwdriver.

What is claimed is:

1. Variable-capacitance capacitor for use in a circuit of microstrip configuration, comprising a substrate of dielectric material, a plane ground plate of conductive material arranged in contact with one of the broad surfaces of the substrate, and a narrow strip-like conductor provided in contact with the other larger surface of the substrate, wherein the ground plate being made up of at least two parts arranged so as to be insulated from one another, a conductive connection being established between the narrow strip-like conductor and a first part of the ground plate, while a conductive member is arranged so as to be slightly spaced from the said first part of the ground plate and insulated therefrom, the disposition of this member relative to the said first part of the ground plate being adjustable, while the conductive member is coupled for high-frequency energy to a second part of the ground plate.

2. Capacitor as claimed in claim 1, wherein a dielectric material of high dielectric constant is interposed between the conductive member and the first part of the ground plate.

3. Capacitor as claimed in claim 2, wherein the conductive member is made of aluminium and the dielectric material is an oxide film on the aluminium member.

4. Capacitor as claimed in claim 1, characterized in that the conductive connection between the narrow strip-like conductor and the first part of the ground plate is a metallized-through hole.

5. Capacitor as claimed in claim 1, characterized in that on those surfaces of the parts of the ground plate which are remote from the substrate a layer is provided in which the conductive member is supported.

6. Capacitor as claimed in claim 5, characterized in that the second part of the ground plate is formed with a circular opening in which a falcate first part of the ground plate is situated, the facing portion of the layer being formed with a bore in which a cylindrical conductive member is disposed, part of the surface of the end of the member facing the ground plate being provided with a raised portion of falcate section.

* * * * *